United States Patent [19]
Araki et al.

[11] Patent Number: 5,255,116
[45] Date of Patent: Oct. 19, 1993

[54] ORIGINAL SCANNING APPARATUS

[75] Inventors: Keisuke Araki, Tokyo; Kazuo Fujibayashi, Kawasaki; Miho Tanaka, Yokohama, all of Japan

[73] Assignee: Canon Kabushiki Kaisha, Tokyo, Japan

[21] Appl. No.: 835,341

[22] Filed: Feb. 14, 1992

[30] Foreign Application Priority Data

Feb. 18, 1991 [JP] Japan ................. 3-46152
Apr. 16, 1991 [JP] Japan ................. 3-109680
Jul. 5, 1991 [JP] Japan ................. 3-191158

[51] Int. Cl.$^5$ .............................. G02B 26/08
[52] U.S. Cl. ......................... 359/212; 359/196;
359/742; 359/868; 355/55; 362/6
[58] Field of Search .............. 359/212, 196, 197, 198,
359/711, 641, 742, 793, 800, 867, 868, 869;
355/55, 56, 57, 60, 49; 362/6, 277

[56] References Cited

U.S. PATENT DOCUMENTS

| | | | |
|---|---|---|---|
| 3,752,558 | 8/1973 | Lloyd | 359/198 |
| 3,758,774 | 9/1973 | Hildenbrandt | 362/277 |
| 4,473,865 | 9/1984 | Landa | 362/6 |
| 4,794,427 | 12/1988 | Shirai et al. | 355/49 |
| 4,859,043 | 8/1989 | Carel et al. | 359/742 |
| 4,894,682 | 1/1990 | Kondo et al. | 355/55 |

FOREIGN PATENT DOCUMENTS

| | | |
|---|---|---|
| 53-41976 | 11/1978 | Japan . |
| 55-135871 | 10/1980 | Japan . |
| 58-115456 | 7/1983 | Japan . |
| 59-126526 | 7/1984 | Japan . |

*Primary Examiner*—Loha Ben
*Attorney, Agent, or Firm*—Fitzpatrick, Cella, Harper & Scinto

[57] ABSTRACT

The present invention provides an original scanning apparatus comprising, an original support plate on which an original is rested, a fixed point light source having a width smaller than that of the original support plate, a shiftable reflection member for reflecting light beams emitted from the light source toward the original support plate, and a first deflector member for deflecting the light beams emitted from the light source in a slit widthwise direction and a second deflector member for deflecting the light beams in a slit longitudinal direction, the first and second deflector members being formed discretely.

26 Claims, 9 Drawing Sheets

ORIGINAL SCANNING APPARATUS

BACKGROUND OF THE INVENTION

1. Field of the Invention

The present invention relates to an original scanning apparatus used with a copying machine and the like, and more particularly, it relates to an illuminating or lighting apparatus for scanning an original, wherein a point light source is fixed and a reflection member is shifted.

2. Related Background Art

Conventionally, a lighting apparatus wherein a point light source is fixed and a reflection optical system is shifted to scan an area to be illuminated has already been known, as disclosed in the Japanese Patent Publication No. 53-41976.

Figure 20:
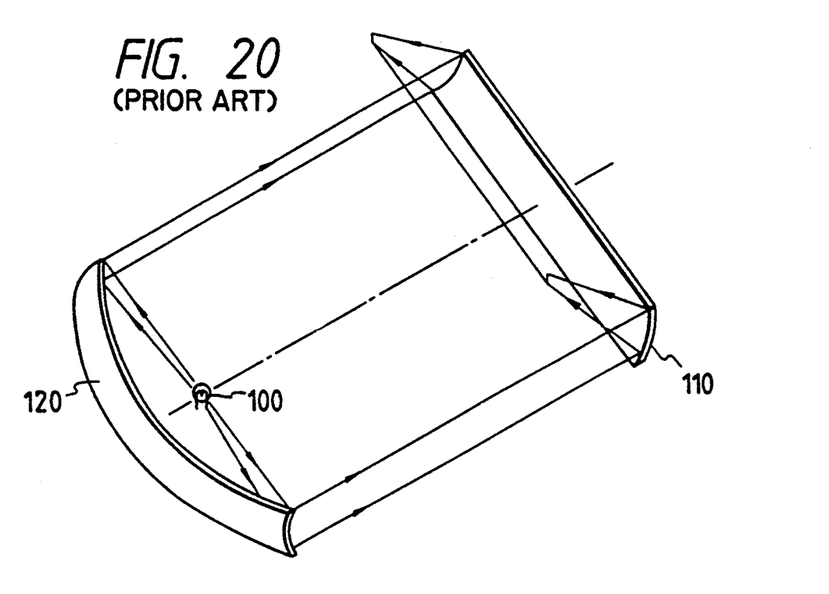
FIG. 20 is a perspective view of a conventional original scanning apparatus.
Figure 21:
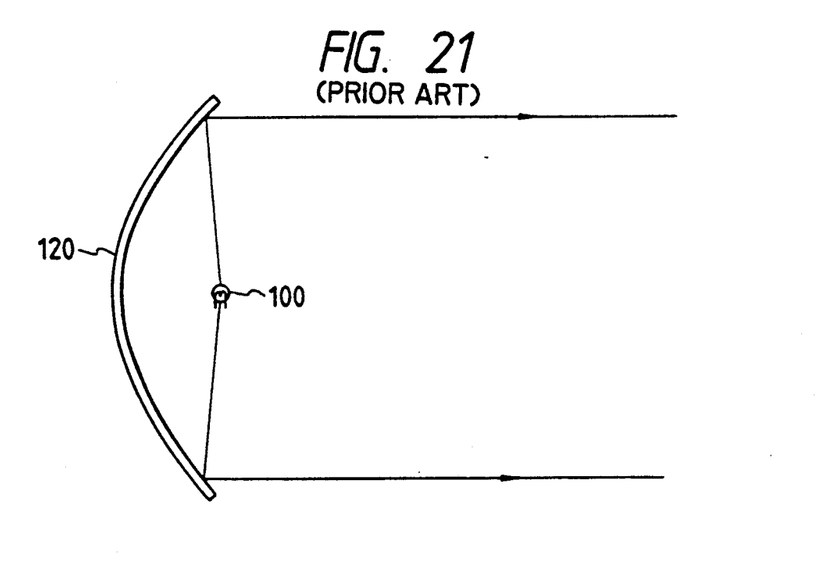
FIG. 21 is a plan view of the apparatus of FIG. 20.
Figure 22:
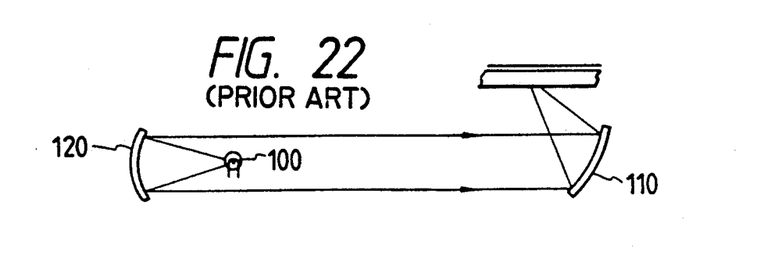
FIG. 22 is a side view of the apparatus of FIG. 20.

FIGS. 20-22 show a lighting mechanism of such lighting apparatuses, in which FIG. 20 is a perspective view of such lighting apparatus, FIG. 21 is a plan view of the apparatus of FIG. 20, and FIG. 22 is a side view of the apparatus of FIG. 20. By the way, when the point light source is used, it is necessary to convert scattered light beams into parallel light beams in order to prevent the reduction in a light amount due to the shifting movement of a reflection hood. In the lighting apparatus shown in FIGS. 20-22, it is so designed that light beams scattered from a light source 100 are converted into parallel beams by a reflection mirror 120 having a parabolic surface which can focus light beams onto the light source. By shifting a reflection hood 110 with a scanning movement, an area to be illuminated is scanned.

Incidentally, in such a conventional lighting apparatus, the scattered light beams from the light source 100 were collimated (i.e., converted into parallel beams) at a time only by using the parabolic reflection mirror 120, as mentioned above.

However, as shown in FIG. 20, the parabolic reflection mirror 120 for collimating the light beams has an elongated shape. That is, the collimated light beams by the parabolic reflection mirror have a longitudinal length of 200-300 mm, but have a width or height of 30-40 mm which is greater than a width of a slit merely by several times. Thus, a distance between the light source and an apex of the parabolic reflection mirror is substantially determined by the longitudinal length of the reflection mirror, and, this distance cannot be considerably reduced. That is to say, in order to arrange the light source nearer to the parabolic reflection mirror, the latter must be bent considerably along its longitudinal length. If to do so, since the parabolic reflection mirror is also bent along the widthwise direction, it is distorted at a central portion thereof, with the result that the light beams cannot be collimated correctly.

Accordingly, the conventional lighting apparatus has a drawback that the efficiency for gathering the light beams in the widthwise direction is considerably reduced, since the light source cannot be arranged in the vicinity of the parabolic reflection mirror. Further, if the light source is arranged in the vicinity of the parabolic reflection mirror, since the scattered light beams can be gathered by the parabolic reflection mirror within a greater angular range along the longitudinal direction, the difference in the light amount between longitudinal end portions and the central portion of the reflection mirror will be too great.

In order to match the light amount at the central portion with those at the end portions of the reflection mirror, the light amount of the central portion must be greatly reduced by using a filter, light amount correcting plate and the like. As a result, the available light amount was considerably reduced.

SUMMARY OF THE INVENTION

An object of the present invention is to provide an original scanning apparatus which can correctly collimate light beams emitted from a point light source and can effectively utilize a light amount.

Another object of the present invention is to provide an original scanning apparatus wherein light beams scattered from a point light source are converted into parallel light beams by two light gathering members or condensing members.

The other objects of the present invention will be apparent from the following explanation.

DETAILED DESCRIPTION OF THE PREFERRED EMBODIMENTS

The present invention will now be explained in connection with embodiments thereof with reference to the accompanying drawings.

Figure 1:
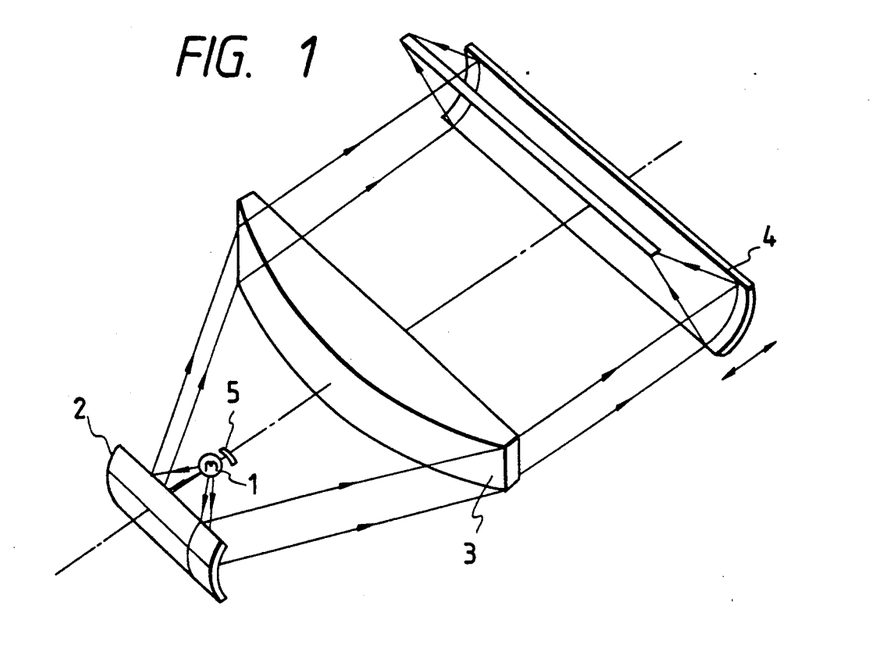
FIG. 1 is a perspective view of an original scanning apparatus according to a first embodiment of the present invention.
Figure 2:
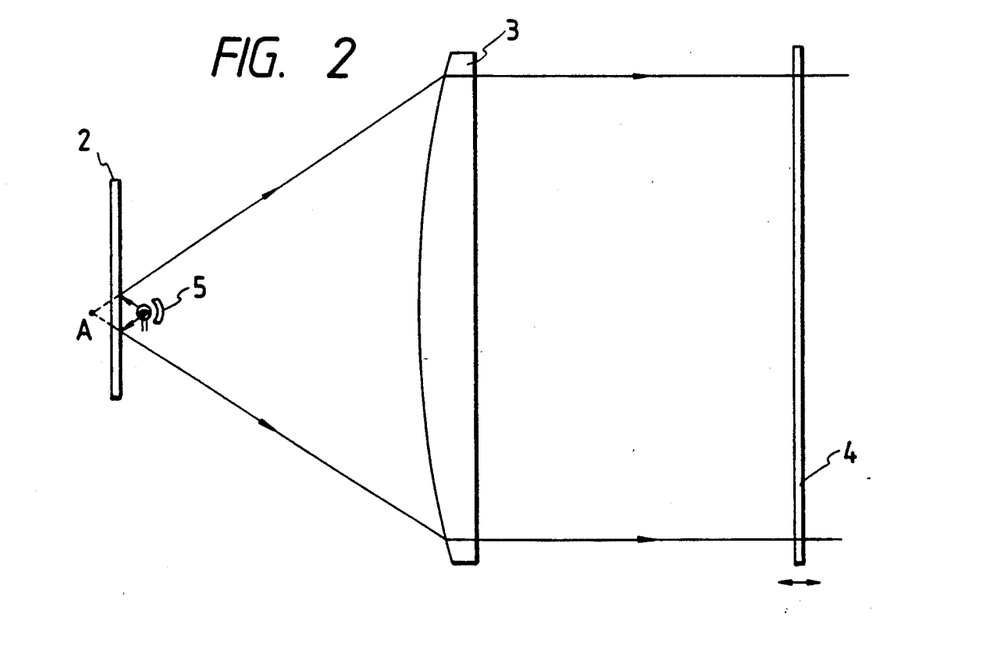
FIG. 2 is a plan view of the apparatus of FIG. 1.
Figures 3, 4:
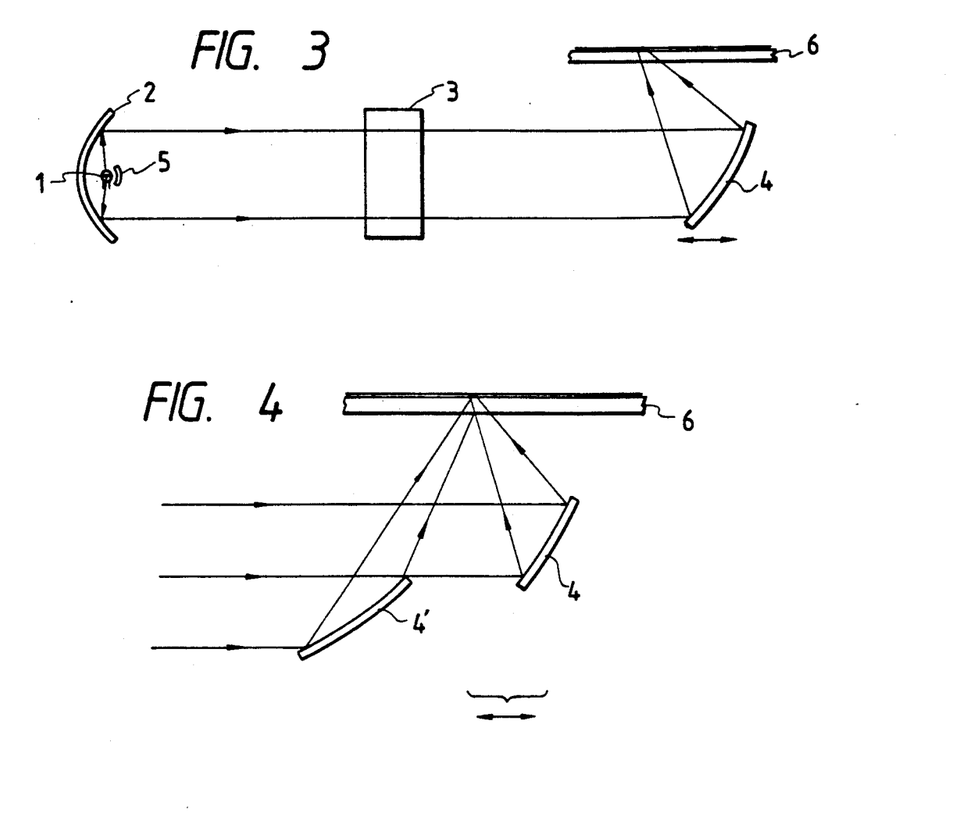
FIG. 3 is a side view of the apparatus of FIG. 1.
FIG. 4 is a view showing an alteration of the apparatus of FIG. 1.

FIGS. 1 to 3 show an original scanning apparatus according to a first embodiment of the present invention, where FIG. 1 is a perspective view of the original scanning apparatus, and FIGS. 2 and 3 are a plan view and a side view of the apparatus, respectively.

In FIGS. 1 to 3, a point light source 1 is arranged at a fixed position and has a dimension sufficiently smaller than a width of an original support plate in a direction perpendicular to a scanning direction. The light source has only one luminous body therein. A shiftable reflection mirror 4 serves to receive light emitted from the light source 1 and to perform the slit exposure. A fixed reflection mirror 2 is disposed to collimate light beams emitted from the light source 1 in an up-and-down direction (i.e., a widthwise direction of the slit) and has a focal point on the light source 1. The reflection mirror 2 constitutes a first deflector means and is comprised of a semi-cylindrical plate an inner surface of which serves to reflect the light from the point light source 1. The inner surface describes a parabolic line in a cross-section (section along the up-and-down direction in FIG. 1; see FIG. 3) of the reflection mirror 2.

As shown in FIG. 2, a cylindrical lens 3 is arranged to receive light beams reflected by the reflection mirror 2 and to collimate the light beams in the other direction, i.e., a longitudinal direction of the slit (horizontal direction in FIG. 1). The cylindrical lens 3 constitutes a second deflector means. After passing through the cylindrical lens 3, the light beams are completely collimated with respect to both the up-and-down direction and the horizontal direction. The completely collimated light beams are gathered on an original (an area to be illuminated) rested on an original support plate 6 by the reflection mirror 4 having the light gathering ability (condensing ability) and constituting a part of a shiftable scanning system, and are reflected from the original, as shown in FIG. 3.

With this arrangement, the light beams scattered from the point light source 1 are collimated by the semi-cylindrical reflection mirror 2 only in the widthwise direction (up-and-down direction in FIG. 1). However, the scattered light beams are not collimated with respect to the longitudinal direction (horizontal direction in FIG. 1) by the reflection mirror 2, as shown in FIG. 2, the scattered light beams are diverged from the reflection mirror as if they are scattered from a point A positioned outsides of the parabolic surface of the reflection mirror 2. The cylindrical lens 3 serves to collimate such light beams diverged in the longitudinal direction. After passing through the cylindrical lens, the light beams become completely parallel light beams because they have been collimated with respect to both the up-and-down direction and the longitudinal direction.

In this way, when the focal length of the cylindrical lens 3 is set to have a value sufficiently greater than the focal length of the parabolic reflection mirror 2 in the widthwise direction thereof, it is possible to reduce the difference in the light amount between longitudinal end portions and central portions of the reflection mirror 2.

Further, as apparent from FIG. 3, contrary to the conventional case, since the parabolic reflection mirror 2 is not bent along the longitudinal direction, it is possible to make the manufacture of the parabolic reflection mirror easier in comparison with the conventional case, and to reduce the distance between the light source 1 and the reflection mirror 2 without enlarging the mirror 2, thus improving the light gathering ability.

As mentioned above, the light beams completely collimated by the reflection mirror 2 and the cylindrical lens 3 are sent to the shiftable reflection mirror 4 acting as the light gathering means of the shiftable scanning system to illuminate an area to be illuminated for the slit scanning.

Incidentally, in FIGS. 1 to 3, there is provided a small reflection mirror 5 which reflects light beams from missing directly toward the cylindrical lens 3 and returns them to the point light source 1 again, whereby undesirable light beams are prevented from reaching the cylindrical lens 3 directly.

FIG. 4 shows an alteration of the shiftable reflection mirror 4 of FIG. 1. More particularly, in this alteration, the shiftable reflection mirror 4 is divided into two reflection mirror portions 4 and 4' so that the area to be illuminated can be lighted or illuminated from the left and right sides. In this way, any shadow on the original can be eliminated or reduced when an original comprising image papers adhered onto a sheet is illuminated for a copying operation.

Figure 5:
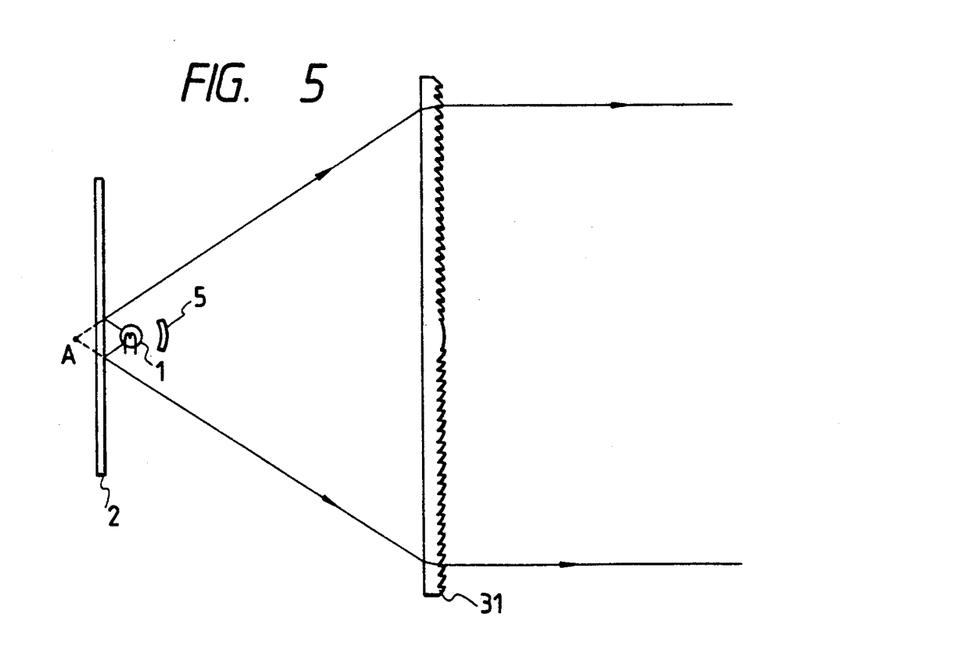
FIG. 5 is a plan view of an original scanning apparatus according to a second embodiment of the present invention.

FIG. 5 shows an original scanning apparatus according to a second embodiment of the present invention. Since the fundamental construction of this scanning apparatus is substantially the same as that of the first embodiment, the difference between them will mainly be explained. The cylindrical lens 3 used in the above-mentioned first embodiment is made of, for example, one-piece glass, synthetic resin or the like. Thus, when the length to be illuminated is long such as 300 mm, the cylindrical lens will become heavy. Further, in the embodiment shown in FIGS. 1 to 3, the refraction surface of the cylindrical lens for collimating the light beams is generally nonspherical (hyperboloid as in the first embodiment). Thus, it is difficult to finish such cylindrical lens and the manufacturing cost of the lens becomes expensive. To avoid such inconvenience, in this second embodiment, the cylindrical lens 3 is replaced by a cylindrical Fresnel lens 31. With this arrangement, it is possible to obtain a lighter and cheaper lighting system.

Figure 6:
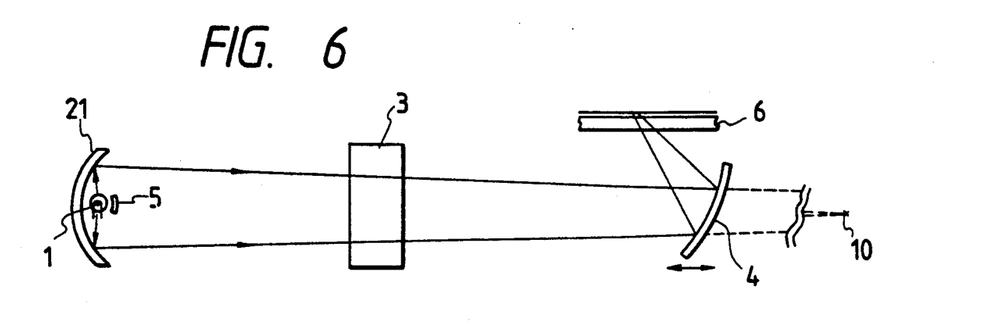
FIG. 6 is a side view of an original scanning apparatus according to a third embodiment of the present invention.

FIG. 6 shows an original scanning apparatus according to a third embodiment of the present invention. Also, regarding this embodiment, the characteristic portions will be mainly explained. In the above first and second embodiments, the parabolic reflection mirror 2 was used as a semi-cylindrical reflection mirror for collimating the light beams in the widthwise direction, by assuming that the light source is a complete point source of light. However, although there is no practical problem in the first and second embodiments, since the actual light source has a substantial dimension more or less, strictly speaking, the light beams incident to the parabolic reflection mirror 2 and reflected therefrom tend to be slightly diverged. To suppress this phenomenon, in this third embodiment, in place of the parabolic reflection mirror, an elliptical surface reflection mirror having an elliptical surface slightly offset from the parabolic surface is provided.

More particularly, in the embodiment shown in FIG. 6, in place of the parabolic surface reflection mirror 2 of FIG. 3 in the first embodiment, an elliptical surface reflection mirror 21 is provided. The latter is formed by a portion of an elliptical cylinder obtained by extending an ellipsoid (having a first focal point positioned at the light source slightly offset from the parabolic surface and a second focal point 10 remote from the scanning reflection mirror (hood) 4) toward a direction perpendicular to a plan including the light source and the ellipsoid. According to this embodiment, it is possible to eliminate the abovementioned inconvenience and to improve the available light amount.

Figure 7:
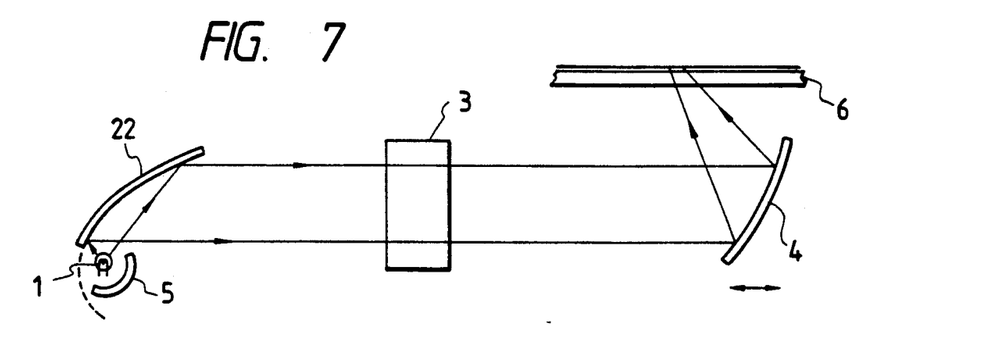
FIG. 7 is a side view of an original scanning apparatus according to a fourth embodiment of the present invention.

Next, an embodiment wherein the light beams are not blocked by the light source and the small reflection mirror 5 will be explained. FIG. 7 shows an original scanning apparatus according to a fourth embodiment of the present invention. The explanation of constructural elements similar to those in the above first embodiment will be omitted, and the characteristic portions will be mainly explained.

In this fourth embodiment, in place of the parabolic reflection mirror 2 of the first embodiment, a parabolic reflection mirror 22 is provided having the same parabolic surface as the reflection mirror 2 but comprising a different parabolic surface portion excluding a symmetrical axis of the parabola. With this arrangement, the light beams collimated in the widthwise direction can be prevented from being blocked by the light source and the small reflection mirror 5 for shielding the haunting light beams.

Figure 8:
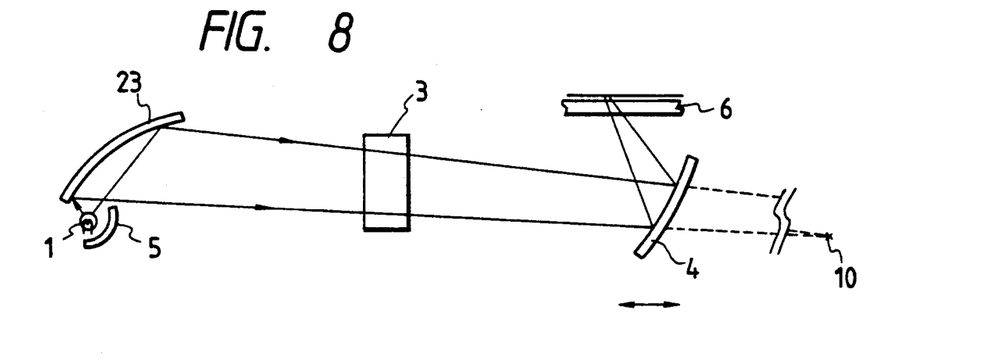
FIG. 8 is a side view of an original scanning apparatus according to a fifth embodiment of the present invention.

FIG. 8 shows a fifth embodiment of the present invention. In this embodiment, in place of the parabolic reflection mirror 22 of the fourth embodiment shown in FIG. 7, an elliptical surface reflection mirror 23 is used. Also with this embodiment, it is possible to improve the available light amount.

Incidentally, in the third to fifth embodiments shown in FIGS. 6 to 8, a cylindrical Fresnel lens as shown in FIG. 5 may be used as the second deflector means. In this case, it is possible to make the apparatus lighter and cheaper.

Next, an embodiment wherein the light beams are not blocked by the light source and it is not required to provide the small reflection mirror 5 will be explained.

Figure 9:
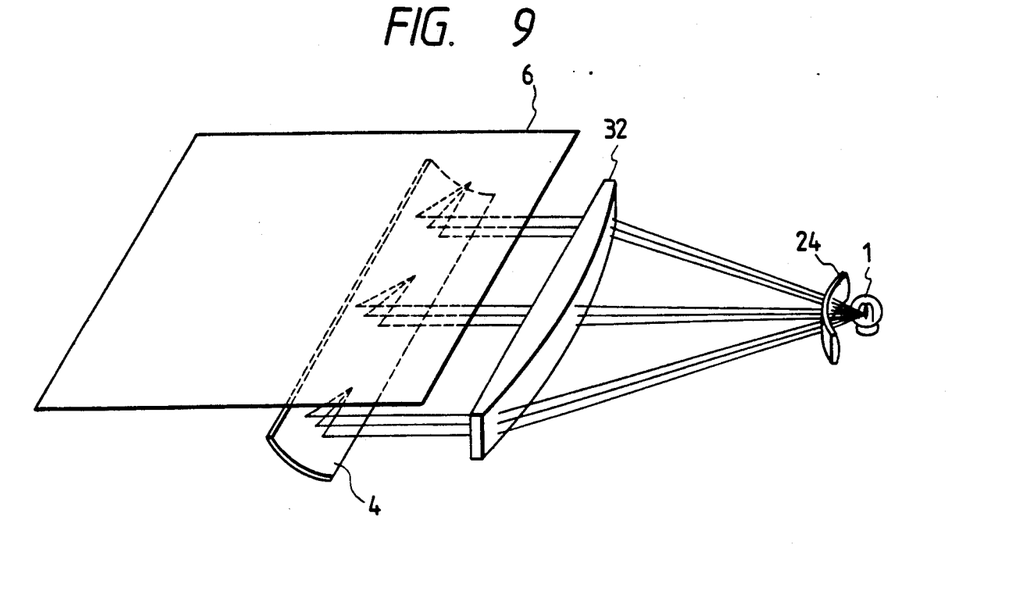
FIG. 9 is a perspective view of an original scanning apparatus according to a sixth embodiment of the present invention.

FIG. 9 shows a sixth embodiment of the present invention. As shown in FIG. 9, an original scanning apparatus according to the present invention comprises a substantially point light source lamp 1 fixed remote from and below an original support glass plate 6, a cylindrical lens 32 acting as a second lens means, a toric lens 24 acting as a first lens means, and a shiftable reflection mirror 4 acting as a shiftable reflection means shiftably mounted below the original support glass plate 6.

Figure 10:
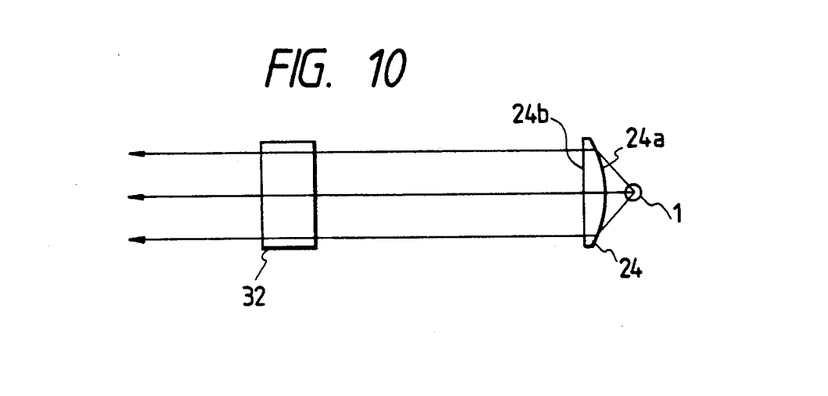
FIG. 10 is a side view of the apparatus of FIG. 9.
Figure 11:
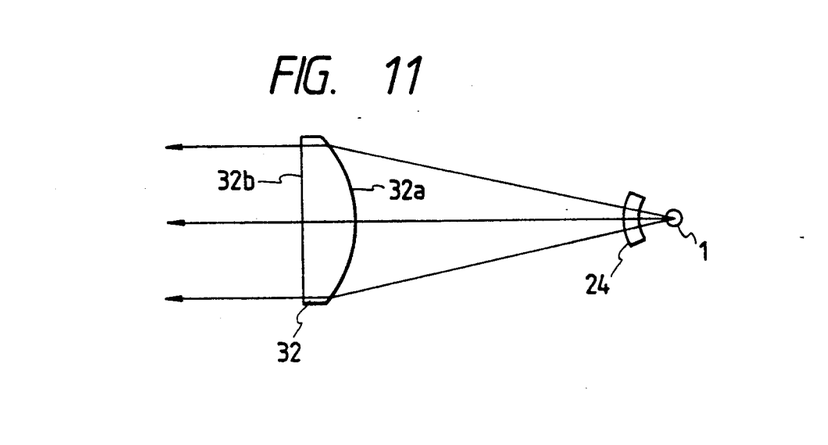
FIG. 11 is a plan view of the apparatus of FIG. 9.

The toric lens 24 is so shaped that, when sectioned along a vertical plane as shown in FIG. 10, it has a circular arc 24a convexly protruding toward the light source lamp 1 and a straight line 24b so as to form a collimator lens having a focus at the light source lamp 1 and, when sectioned along a horizontal plane as shown in FIG. 11, it has inner and outer circular arcs each having a curvature around the light source lamp 1. Further, as shown in FIG. 11, the cylindrical lens 32 has an arcuate surface 32a convexly protruding toward the toric lens 24 and a flat surface 32b directing toward the shiftable reflection mirror 4.

With this arrangement, the light beams diverged from the light source lamp 1 are firstly sent to the toric lens 24 disposed in the vicinity of the light source lamp 1, where the incident light beams are collimated in the widthwise direction of the slit, as shown in FIG. 10. In this point, the incident light beams ar not collimated in the longitudinal direction of the slit, as shown in FIG. 11. The light beams collimated only in the widthwise direction are then sent to the cylindrical lens 32, where the incident light beams are also collimated in the longitudinal direction (FIG. 11). Consequently, the non-parallel light beams emitted from the light source lamp 1 are completely collimated in both the widthwise and longitudinal directions to form the slit-shaped parallel light beams which is, in turn, sent to the shiftable reflection mirror (FIG. 9).

Figure 12:
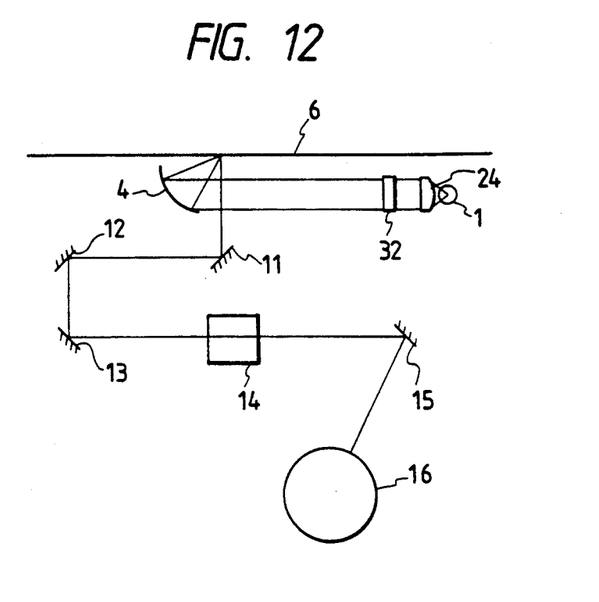
FIG. 12 is a schematic elevational view of a copying machine incorporating the apparatus of FIG. 9 therein.

FIG. 12 shows a copying machine on which the original scanning apparatus according to the above sixth embodiment is mounted, wherein the diverged light beams emitted from the light source lamp 1 are collimated by the toric lens 24 and the cylindrical lens 32 as mentioned above and then are sent to the shiftable reflection mirror 4. The shiftable reflection mirror 4 reflects the collimated light beams toward the original support glass plate 6 to illuminate and scan the original (not shown) rested on the original support glass plate 6, while shifting from the vicinity of the cylindrical lens 32 in a left direction (FIG. 12). The light beams reflected by the original (not shown) rested on the original support glass plate 6 is sent to a reflection mirror 11 shiftable integrally with the shiftable reflection mirror 4. The light beams incident to the reflection mirror 11 are reflected therefrom and are then reflected by reflection mirrors 12, 13 integrally interconnected and shifted in synchronous with the shiftable reflection mirror 4 at a speed of ½ of that of the mirror 4 to reach a magnification changing lens 14. The light beams passed through the magnification changing lens 14 are reflected by a reflection mirror 15 to be focused on a photosensitive drum 16.

As mentioned above, with this arrangement, since the light beams emitted from the light source lamp 1 are directly sent to the toric lens 24 and the cylindrical lens 32 to be converted into the parallel light beams (without returning the light beams to the light source after they are collimated by the reflector means as in the conventional case), the light beams are not blocked by the light source 1 and the small reflection mirror 5, thus preventing the occurrence of the irregularity in the light amount. Further, since the light beams emitted from the light source 1 are discretely and sequentially collimated by the toric lens 24 and the cylindrical lens 32 without collimating them in both widthwise and longitudinal directions of the slit at a time, it is possible to collimate the light beams scattered at a wider angular range and to prevent the distortion of the image.

Figure 13:
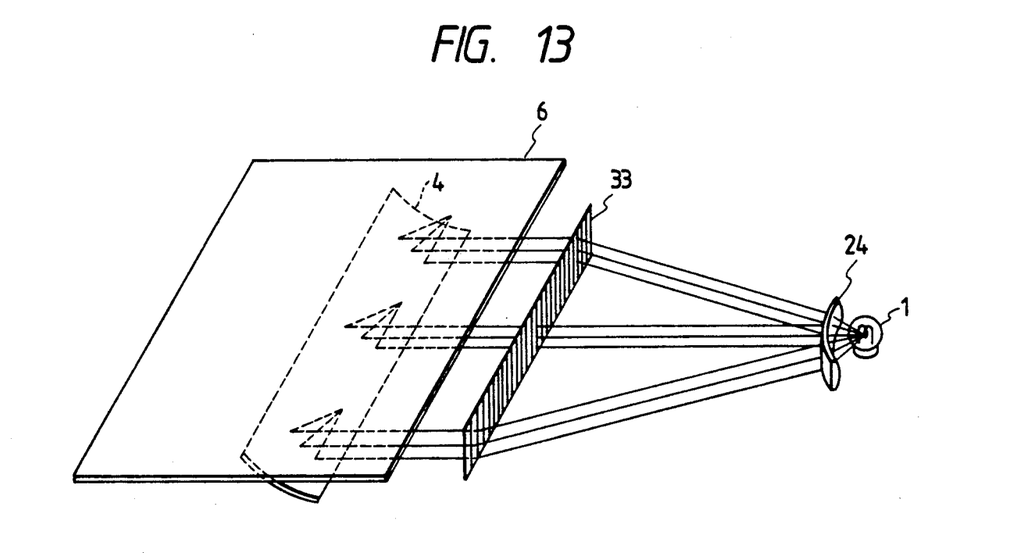
FIG. 13 is a perspective view showing an alteration of the apparatus of FIG. 9.

As shown in FIG. 13, in place of the cylindrical lens 32, a linear Fresnel lens 33 may be fixedly mounted as the second lens means. In this case, the light beams collimated only in the widthwise direction of the slit and emitted from the toric lens 24 are passed through the linear Fresnel lens 33, where the light beams are also collimated in the longitudinal direction of the slit. With this arrangement, it is possible to make the apparatus lighter in weight.

Next, a seventh embodiment of the present invention will be explained with reference to FIGS. 14 and 15.

In this embodiment, an optical lighting system is incorporated into a copying machine having a fixed light source. As shown in FIG. 14, the optical lighting system comprises a point light source 1 such as a halogen lamp, a cylindrical linear Fresnel lens 25 having a curvature around the light source, cylindrical lens 32, and a lighting cylindrical concave mirror 4 acting as a shiftable reflection mirror. The construction wherein the light beams reflected by the original rested on the original support plate 6 is directed from the original to the photosensitive drum 16 is substantially the same as that of the sixth embodiment shown in FIG. 14.

The light beams scattered from the point light source 1 are gathered and collimated in the widthwise direction of the slit by means of the linear Fresnel lens 25 having co-axial grooves formed on its outer surface and then are collimated in the longitudinal direction of the slit by means of the cylindrical lens 32. The light beams collimated by the linear Fresnel lens 25 and the cylindrical lens 32 and emitted from the latter are substantially parallel with each other. These parallel light beams are gathered on the original support plate 6 in the slit pattern by means of the cylindrical concave mirror 4.

Figure 14:
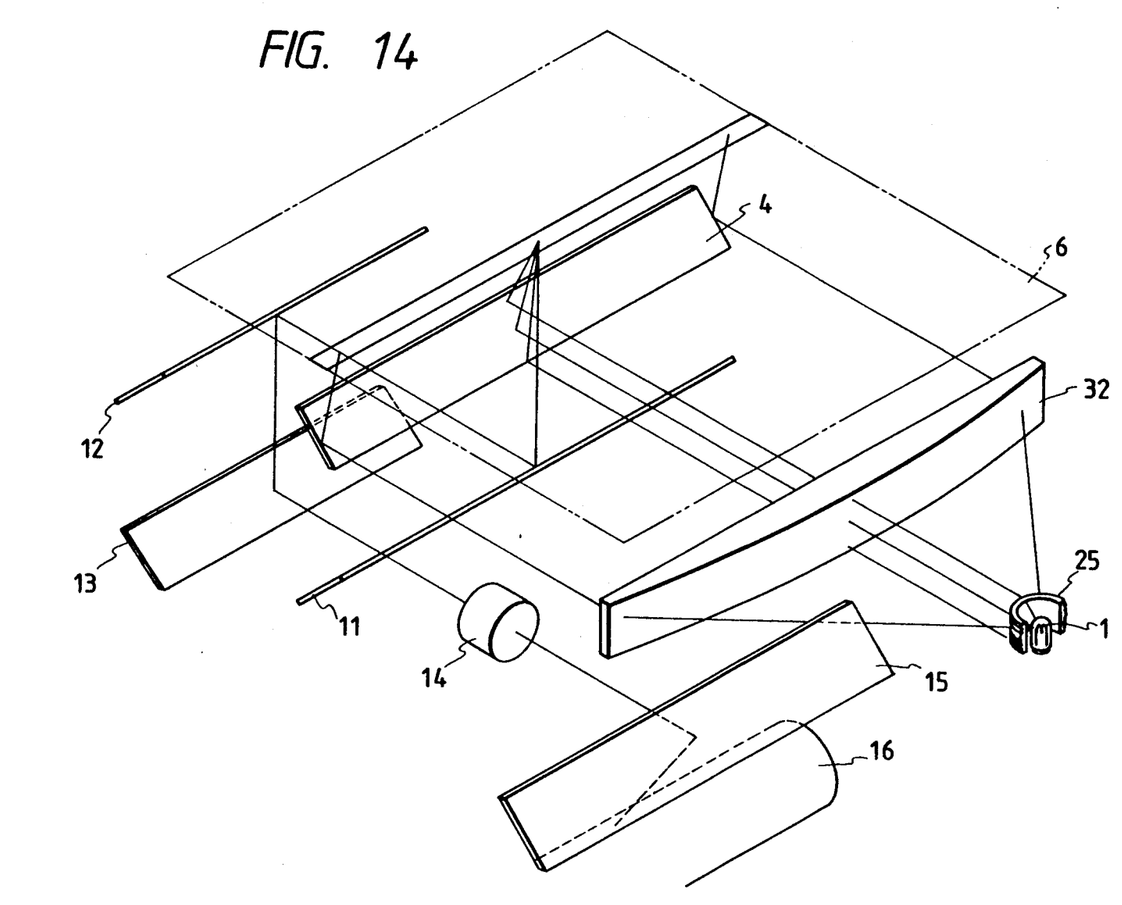
FIG. 14 is a perspective view of an original scanning apparatus according to a seventh embodiment of the present invention.
Figure 15A:
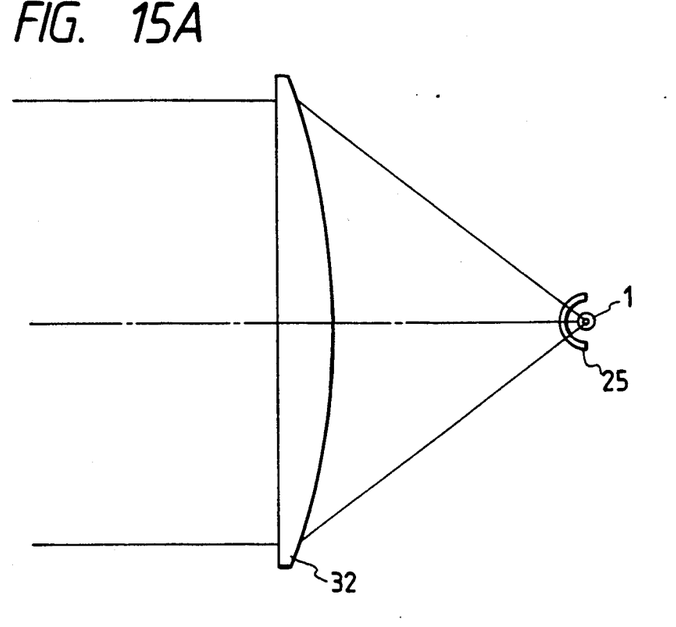
FIG. 15A is a plan view of the apparatus of FIG. 14.
Figure 15B:
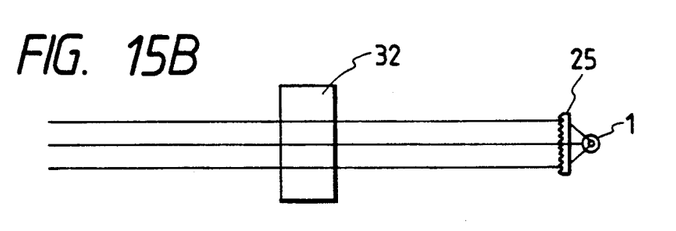
FIG. 15B is a side view of the apparatus of FIG. 14.

Incidentally, FIG. 15A is a sectional plan view of the lighting optical system of FIG. 14, and FIG. 15B is a side sectional view of such optical system. In this way, according to the present invention, by arranging the linear Fresnel lens 25 in the vicinity of the light source, it is possible to effectively gather or collect the light beams in the widthwise direction of the slit having a small space or width provided in the lighting system, among the light beams scattered from the light source 1 of FIG. 14. Further, although the cylindrical lens 32 has a relatively long focal distance corresponding to the longitudinal length of the slit, since a distance between the linear Fresnel lens 25 and the cylindrical lens 32 is long, some freedom of the construction of the lighting system can be given; for example, a reflector or reflectors can be incorporated into the lighting system. Incidentally, the cylindrical concave mirror 4 for illuminating the surface of the original is shifted integrally with the reflection mirror 11 to scan the original surface.

Figure 16:
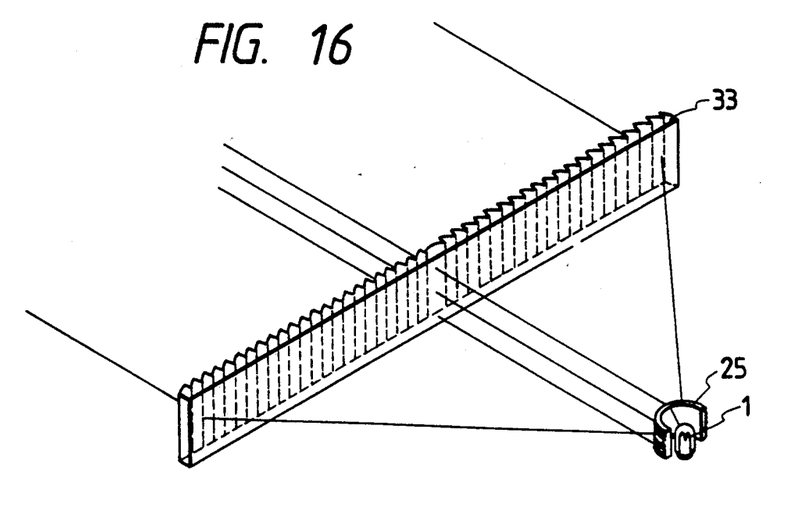
FIG. 16 is a perspective view showing an alteration of the apparatus of FIG. 14.

FIG. 16 shows an embodiment wherein the cylindrical lens 32 of FIG. 14 is replaced by a linear Fresnel lens 33. Also in this case, the same technical advantage as that of the embodiment of FIG. 14 can be obtained. Incidentally, grooves formed in the linear Fresnel lens 33 shown in FIG. 16 extend an up-and-down direction perpendicular to the original surface, i.e., original support plate 6.

Figure 17:
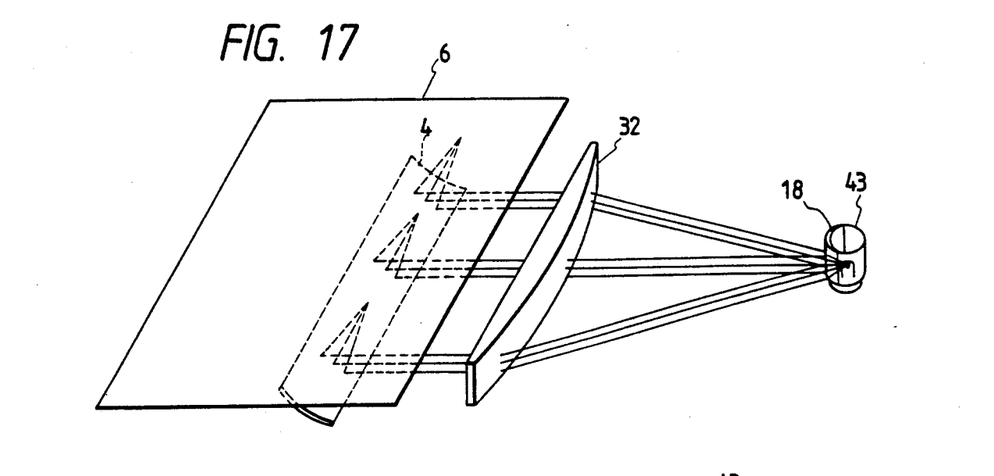
FIG. 17 is a perspective view of an original scanning apparatus according to an eighth embodiment of the present invention.
Figure 18:
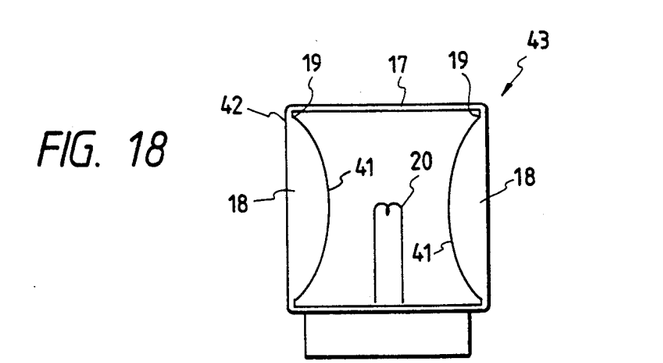
FIG. 18 is a sectional view of a light source of the apparatus of FIG. 17.

Next, an eighth embodiment of the present invention will be explained with reference to FIGS. 17 and 18.

In this embodiment, in place of the toric lens 24 of FIG. 9, a lamp tube lens 18 is used as the first lens means. As shown in FIG. 18, the lamp tube lens 18 is formed as a part of a lamp tube 17 constituting an outer cover of a light source lamp 43 to have the same sectional configuration as that of the toric lens 24. More particularly, the lamp tube 18 is obtained by forming a convex surface 41 protruding toward a filament 20 of the lamp on an inner peripheral surface 19 of the lamp tube 17. Thus, as shown in FIG. 17, the light beams emitted from the light source lamp 43 with the lamp tube lens 18 are already collimated in the widthwise direction of the slit (by the lamp tube lens 18) at the departure from the light source lamp, and then are sent to the cylindrical lens 32, where they are collimated in the longitudinal direction of the slit. With this arrangement, it is possible to make the apparatus simpler and more lighter in weight.

Figure 19:
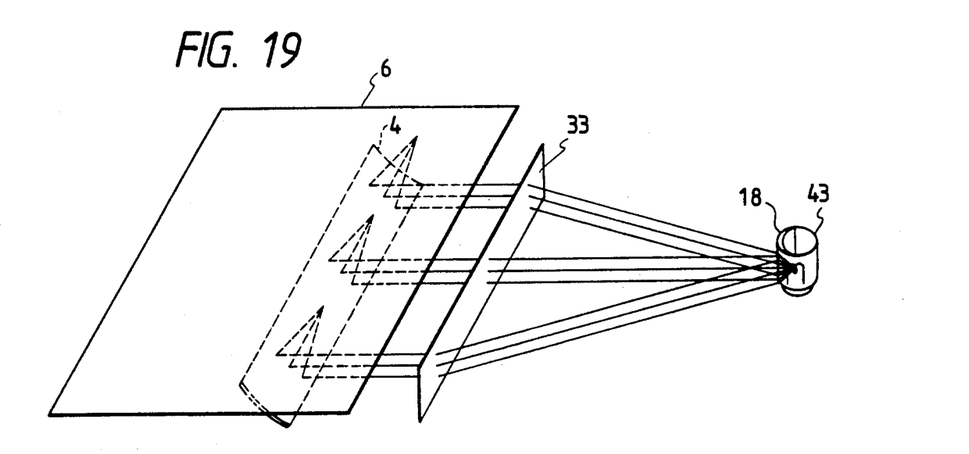
FIG. 19 is a perspective view showing an alteration of the apparatus of FIG. 17.

As shown in FIG. 19, since the light source lamp 43 with lens is used as the point light source and the linear Fresnel lens 33 is used as the second lens means, the apparatus can be made more compact and light-weighted.

Incidentally, while the toric lens 24 used in the aforementioned embodiment had the circular arc 24a convexly protruding toward the light source lamp 1 and the straight line 24b in its vertical section (FIG. 10), in place of such straight line 24b, a circular arc convexly protruding toward the cylindrical lens 32 may be used. Further, while the lamp tube lens 18 in the eighth embodiment had the inwardly protruding convex surface 41 (FIG. 18) formed only on the inner peripheral surface 19 of the lamp tube 17, a similar outwardly protruding convex surface may also be formed on an outer peripheral surface 42 of the lamp tube 17. Further, while the cylindrical lens 32 had the arcuate surface 32a convexly protruding only toward the toric lens 24 (FIG. 11), a similar arcuate surface convexly protruding toward the shiftable reflection mirror 4 may be formed on the cylindrical lens.

In this way, by forming so-called hyperbolic surfaces on the toric lens 24, lamp tube lens 18 and cylindrical lens 32, it is possible to reduce the aberration and to reduce the thickness of the lens, thus making the apparatus lighter in weight and compact.

As mentioned above, while particular embodiments of the present invention were described, the present invention is not limited to such embodiments, but, various alterations and modifications can be effected within the scope of the present invention.

What is claimed is:

1. An original scanning apparatus, comprising:
   an original support plate on which an original is rested;
   a fixed point light source having a width smaller than that of said original support plate;
   a shiftable reflection member for reflecting light beams emitted from said light source toward said original support plate, said shiftable reflection member being shifted in parallel with said original support plate to scan the original with slit-exposure; and
   a first deflector member for deflecting the light beams emitted from said light source in a slit widthwise direction and a second deflector member for deflecting the light beams, deflected from said first deflector member, in a slit longitudinal direction, said first and second deflector members being formed discretely;
   wherein the light beams deflected by said first and second deflector members are reflected toward said original support plate by said shiftable reflection member.

2. An original scanning apparatus according to claim 1, wherein the light beams emitted from said light source are deflected or converted into parallel light beams.

3. An original scanning apparatus according to claim 1, wherein the light source is arranged in the vicinity of said first deflector member.

4. An original scanning apparatus according to claim 1, wherein the light source has a single luminous body.

5. An original scanning apparatus according to claim 1, further comprising a shield member for shielding a light beam directly advancing from said light source to said shiftable reflection member.

6. An original scanning apparatus according to claim 5, wherein an inner surface of said shield member is a reflection surface.

7. An original scanning apparatus, comprising:

an original support plate on which an original is rested;

a fixed point light source having a width smaller than that of said original support plate;

a shiftable reflection member for reflecting light beams emitted from said light source toward said original support plate, said shiftable reflection member being shifted in parallel with said original support plate to scan the original with slit-exposure; and a fixed reflection member for gathering the light beams emitted from said light source in a slit widthwise direction and a lens for gathering the light beams, reflected from said fixed reflection member, in a slit longitudinal direction;

wherein the light beams gathered by said fixed reflection member and said lens are reflected toward said original support plate by said shiftable reflection member.

8. An original scanning apparatus according to claim 7, wherein a reflecting surface of said fixed reflection member comprises a parabolic surface.

9. An original scanning apparatus according to claim 7, wherein a reflecting surface of said fixed reflection member comprises an elliptical surface.

10. An original scanning apparatus according to claim 7, wherein said lens comprises a cylindrical lens.

11. An original scanning apparatus according to claim 7, wherein said lens comprises a Fresnel lens.

12. An original scanning apparatus according to claim 7, wherein the light beams emitted from said light source are gathered as parallel light beams by said fixed reflection member and said lens.

13. An original scanning apparatus according to claim 7, wherein said fixed reflection member is disposed at an upstream side of said lens in an optical path.

14. An original scanning apparatus according to claim 7, wherein said light source is arranged in the vicinity of said fixed reflection member.

15. An original scanning apparatus according to claim 7, wherein said light source has a single luminous body.

16. An original scanning apparatus according to claim 7, further comprising a shield member for shielding a light beam directly advancing from said light source to said shiftable reflection member.

17. An original scanning apparatus, comprising:

an original support plate on which an original is rested;

a fixed point light source having a width smaller than that of said original support plate;

a shiftable reflection member for reflecting light beams emitted from said light source toward said original support plate, said shiftable reflection member being shifted in parallel with said original support plate to scan the original with slit-exposure; and a first lens for gathering light beams emitted from said light source in a slit widthwise direction, and a second lens gathering the light beams, emerged from said first lens in a slit longitudinal direction, said first and second lenses being disposed in an optical path extending from said light source to said shiftable reflection member.

18. An original scanning apparatus according to claim 17, wherein said first lens comprises a toric lens.

19. An original scanning apparatus according to claim 17, wherein said first lens comprises a Fresnel lens.

20. An original scanning apparatus according to claim 17, wherein said first lens is formed on a surface cover of said light source.

21. An original scanning apparatus according to claim 17, wherein said second lens comprises a cylindrical lens.

22. An original scanning apparatus according to claim 17, wherein said second lens comprises a Fresnel lens.

23. An original scanning apparatus according to claim 17, wherein the light beams emitted from said light source are gathered as parallel light beams by said first and second lenses.

24. An original scanning apparatus according to claim 17, wherein said first lens disposed upstream of said second lens in an optical path.

25. An original scanning apparatus according to claim 17, wherein said light source is arranged in the vicinity of said first lens.

26. An original scanning apparatus according to claim 17, wherein said light source has a single luminous body.

* * * * *

UNITED STATES PATENT AND TRADEMARK OFFICE
CERTIFICATE OF CORRECTION

PATENT NO. : 5,255,116
DATED : October 19, 1993
INVENTOR(S) : KEISUKE ARAKI, et al.

It is certified that error appears in the above-indentified patent and that said Letters Patent is hereby corrected as shown below:

COLUMN 1
    Line 53, "If to do so," should read --To do so,--.

COLUMN 3
    Line 50, "2, as" should read --2. As--.
    Line 53, "outsides" should read --outside--.

COLUMN 4
    Line 15, "missing" should read --passing--.

COLUMN 5
    Line 7, "plan" should read --plane--.
    Line 27, "haunting" should read --ghost--.
    Line 28, "haunting" should read --ghost--.

COLUMN 6
    Line 1, "ar" should read --are--.
    Line 10, "is," should read --are,--.
    Line 25, "is" should read --are--.

Line 30, "synchronous" should read --synchronism--.
    Line 49, "at a time," should be deleted.

COLUMN 7
    Line 4, "is" should read --are--.
    Line 65, "more" should be deleted.

COLUMN 8
    Line 2, "weighted." should read --weight.--

UNITED STATES PATENT AND TRADEMARK OFFICE
CERTIFICATE OF CORRECTION

PATENT NO. : 5,255,116

DATED : October 19, 1993

INVENTOR(S) : KEISUKE ARAKI, et al.

It is certified that error appears in the above-indentified patent and that said Letters Patent is hereby corrected as shown below:

COLUMN 10
Line 16, "lens" should read --lens for--.
Line 40, "disposed" should read --is disposed--.

Signed and Sealed this

Nineteenth Day of July, 1994

Attest:

BRUCE LEHMAN

Attesting Officer        Commissioner of Patents and Trademarks